United States Patent [19]

Frisbie

[11] Patent Number: 5,238,121
[45] Date of Patent: Aug. 24, 1993

[54] EAR CORN SELECTION AND TRIMMING DEVICE

[75] Inventor: Donald Frisbie, Northfield, Minn.

[73] Assignee: Computer Controlled Machines of Mn., Inc., Northfield, Minn.

[21] Appl. No.: 760,755

[22] Filed: Sep. 16, 1991

[51] Int. Cl.$^5$ .............................................. B07C 5/02
[52] U.S. Cl. ..................... 209/539; 209/587; 209/617; 209/701; 209/903; 209/939; 198/384; 198/779; 198/803.7; 83/932
[58] Field of Search ............... 209/538, 539, 540, 576, 209/586, 587, 604, 617, 701, 903, 939; 198/365, 370, 384, 399, 779, 803.7; 83/932

[56] References Cited

U.S. PATENT DOCUMENTS

| | | | |
|---|---|---|---|
| 2,791,330 | 5/1957 | Carlson | 209/604 |
| 3,024,905 | 3/1962 | Casler et al. | 209/617 X |
| 3,690,433 | 9/1972 | Buldini | 198/779 X |
| 3,741,371 | 6/1973 | Oldershaw et al. | 198/779 X |
| 4,225,031 | 9/1980 | Frisbie et al. | 198/399 X |
| 4,410,090 | 10/1983 | Sindermann | 209/617 X |
| 5,078,258 | 1/1992 | van der Schoot | 209/701 X |

FOREIGN PATENT DOCUMENTS

0934709 10/1973 Canada .............................. 209/587

*Primary Examiner*—Joseph E. Valenza
*Assistant Examiner*—Tuan N. Nguyen
*Attorney, Agent, or Firm*—James R. Cwayna

[57] ABSTRACT

A device for the automatic and rapid inspection of ears of corn to select ears having a predetermined length wherein the kernels meet selection standards and the ear has uniform characteristics which length will be trimmed from the ear to provide cut lengths of corn for subsequent treatment. The device includes a first conveyor and inspection area for segregating ears as to conditions of acceptability and determination of quality for ultimate use including trimming of certain of the ears into predetermined lengths with a second transport station arranged to receive the ears and to sort them for subsequent use and to convey the ears of predetermined quality to a trimming device wherein the ear of corn is cut into at least one acceptable length.

26 Claims, 10 Drawing Sheets

EAR CORN SELECTION AND TRIMMING DEVICE

RELATED APPLICATIONS

There are no related applications currently on file in the United States Patent Office with which this application should be considered.

FEDERAL SPONSOR

This invention is not made under any federally sponsored research and development arrangement nor any other sponsored research and development arrangement which should be noted.

FIELD OF THE INVENTION

This invention relates generally to devices for interrogation of ear corn in bringing the ears from picked condition to use condition and more specifically to a device which interrogates an ear of corn to determine use classifications thereof for its subsequent use in whole or part with those ears that are selected for cutting and trimming into frozen ear lengths being transported to a cutting device for trimming the same into lengths of uniform quality.

SUMMARY OF THE INVENTION

This invention includes a complete interrogation, transportation and operations unit for processing ears of corn wherein previously husked and cleaned ears of corn are conveyed in singular fashion past an examining or interrogation station to determine most appropriate use of the ears and thereafter sorting the individual ears to such use with ears meeting certain parameters being transported to a trimming device which cuts the ear into predetermined lengths whereby "corn on the cob" is provided to the consumer in such lengths. Other cobs may be directed to kernelling operations or other uses.

A first conveying means includes a roller conveyer which receives previously cleaned and husked ears and transports them in side-by-side fashion through an examining or interrogation section. Within this examining section the ears are rotated to accommodate full inspection of the kernels completely around and longitudinally of the ear and full inspection for ear consistency. In this section each ear is analyzed as to its best use. Certain of the ears may be discarded for various defects with other ears being selected for a variety of uses such as kernel removal with certain ears, pertinent to this invention, being advanced for trimming into predetermined lengths.

The interrogation section includes light transmitting and receiving means and interpretation means which analyze individual kernels of the ear, their layouts and condition to best determine proper resultant ear useage with this secured information transferred through micro processing equipment to sorting and conveying apparatus which directs ears to best use processors. The micro processor controls the position of ear clamps with respect to information gained through interrogation to clamp the ear for transport the ear to its best use area. In use, the trimmed ears are further processed to provide frozen "corn on the cob".

Those ears that are determined by interrogation as unacceptable for frozen "corn on the cob" useage will be shuttled into areas for transport to other processing systems.

The inspection or interrogation station functions as a primary controller for ear selection and classification and is pre-programmable for complete sorting and classification of the ear.

BACKGROUND AND OBJECTS OF THE INVENTION

This invention relates to a device for automatically handling ears of corn and classification thereof for the various and most effective uses to which the ear may be put various uses of corn include canning of kernels, freezing of kernels and the freezing of lengths of ears for consumption as "corn on the cob". Applicant's device takes the husked and cleaned ear of corn through various operations to completely analyze the kernels of the ear and the size of the ear to determine its best ultimate use. Many ears are defective and suitable only for use outside of human consumption. Other ears will meet parameters of use of only the kernels while still other ears will meet the parameters of kernel size and quality and ear size to enable their utilization as trimmed, predetermined lengths. The device of this invention includes at least these basic sorting operations and is easily adapted to enable other classifications for full use of the ear of corn.

Applicants are well aware of the commercially available art for performing the functions of this machine and to the best of their knowledge no such devices or machines exist. As far as patentably reflected art, the applicant is aware of only two previous U.S. patents which relate to ear analyzation with subsequent operations being performed to the ears.

These patents are U.S. Pat. No. 4,225,031, issued Sep. 30, 1990 and U.S. Pat. No. 4,413,722, issued Nov. 8, 1983. Both of these patents are entitled ARTICLE ORIENTATION DEVICE and relate solely to devices which will reject ears of underminimum or overmaximum size and which will rotate ears of proper size such that all ears exiting therefrom are properly oriented, end-to-end, for the subsequent operations to be performed to the ears. These two patents also include interrogation means for rejection of ears which are not properly cleaned or are kernel defective. Neither of these patents part discloses the interrogation of the individual kernels or acceptability of the ear over a predetermined length.

The device disclosed herein will select and determine a length within the length of an ear of corn in which all of the kernels meet predetermined standards and wherein, for example, the diameter within the length meets predetermined standards. Uniformity and consistency of the trimmed length is important in providing frozen "corn on the cob".

It is therefore an object of the applicant's invention to provide a device to receive husked and cleaned ears of corn for interrogation of the ear and its kernels for subsequent use of the same for kernel removal or utilization of the cob with the kernels.

It is a further object of the applicants' invention to provide a device for the transportation of previously cleaned and husked ears of corn through an interrogation station to analyze the kernels of the ear and determine the existence of a predetermined length of the ear to be of a proper size and wherein the kernels meet predetermined standards and thereafter transport such ear to a trimming station.

It is a further object of the applicant's invention to provide a device for trimming predetermined lengths of ears of corn wherein the trimmed length will meet certain parameters of size and kernel quality.

It is a further object of the applicant's invention to provide a device for interrogation and sorting of ears of corn for their most effective use.

These and other objects and advantages of the applicant's invention will more fully appear from a consideration of the accompanying disclosure and drawings.

DESCRIPTION OF A PREFERRED FORM OF THE INVENTION

In accordance with the accompanying drawings, applicants' ear corn selection and trimming device is designated in its entirety 20 and, for description purposes, is divided into an initial ear conveying section 21, an ear interrogation or classification section 22, an alignment, transfer and sorting section 23 and a trimming section 24. A framework designated in its entirety 25 is designed for mounting all of these sections in their appropriate, cooperative and operative positions. Similarly, various drive motors are carried on the framework 25 for effecting synchronized ear movement.

It should initially be understood that applicant's ear corn selection and trimming device provides a unit not only designed to precisely locate, within an ear of corn, a predetermined length of ear which meets certain selection parameters for trimming the ear to this length but also is designed to determine qualities and conditions of all ears passing therethrough for sorting the ears into appropriate use categories and directing the same to appropriate use areas.

For example, certain ears may not be completely cleaned or husked and these would be recycled for further cleaning; certain ears may bear kernels suitable for removal for use as canned corn but may not meet the criteria of good kernels over the predetermined length and these will be shuttled to kernelling devices and other ears may bear kernels which meet the criteria for seed corn and these will be so directed.

These illustrative sorting uses are representative of the possible operations of the unit disclosed herein but should not be considered as limiting the scope of the invention.

Applicant illustrates a wheel-type sorting and transfer section 23. To one skilled in the art, a wheel simply provides one shape of an endless conveyor. Therefore, the illustrated wheel could be of any shape to extend the operative length thereof and with such increased length, more sorting and classification length would be available for use in categorizing ears.

Applicant has also chosen the trimming of the ear to a predetermined length as the end use of the disclosed invention. As should be obvious from the above statements, this is a logical end use illustration but, again, should not be considered as a limiting statement as to invention.

The initial conveyor section 21 is best illustrated in FIGS. 1, 2, 4, 6 and 7. As illustrated therein, two matching pairs of sprocket members 30a, 30b are provided in horizontally spaced relation for carrying a pair of driven chains 31a, 31b between which a plurality of closely associated and rotatable rollers 32 are provided in a manner to carry an individual ear E of corn between adjacent rollers 32. Sufficient support through chain tensioning and, for example, return ramp 33 provided between sprockets 30a, 30b maintains the travel of conveying section 21 in its desired relatively horizontal orientation. Ears of corn are carried between pairs of adjacent rollers 32 such that the ears E are presented in separated fashion as they travel along the conveyor 21 and particularly through the interrogation and classification section 22.

The roller members 32 are in non-controlled condition except for the area directly underlying the interrogation section 22. At and within this section a stationary brake bar 34 is positioned on frame work 25 and this bar 34 provides a friction upper surface 34a to engage the outer periphery of rollers 32 to cause rotation thereof and thus cause rotation of the carried ears E as particularly illustrated in FIG. 7.

The purpose of such controlled rotation is to insure complete kernel inspection of each and every ear as it passes through the interrogation section 22.

Following the friction surface 34a area, a positive drive belt arrangement including a second shaft 30c, pairs of pulleys 30d, 30e and a connective pair of belts 30f cooperates with shaft 30g to afford the now non-rotational transfer mode of the ears E to the transfer section 23. Motor means 35, appropriate pulleys 36a, 36b and belt 36c insure driven contact of belts 30f with the rollers 32 to prevent further rotation thereof such that transfer of ears E from initial conveying section 21 to the alignment, transfer and sorting section 23 is made while the ears are in non-rotative condition.

The interrogation section 22 includes a light source 39a and visual inspecting camera 39b arranged in vertically spaced relation to the rotative ear portion of conveyor 21 for analysis of the kernels of the ear E and the ear itself subject to the parameters of inspection to which the unit has been programmed. With regard to this specific unit, the control program has been selected such that ears having a six inch length of acceptable kernels and ear size will be shuttled to the trimming section 24 for the continued use thereof as either a full six inch length of frozen "corn on the cob" or two three inch lengths of frozen "corn on the cob" while ears of other standards will be directed as stated previously and explained hereinafter. This selected six inch length must also meet other requirements such as diameter, kernel consistency and kernel quality. All to these control parameters are available with proper programming of a micro-processor and the specific program does not constitute a portion of this invention.

Figure 1:
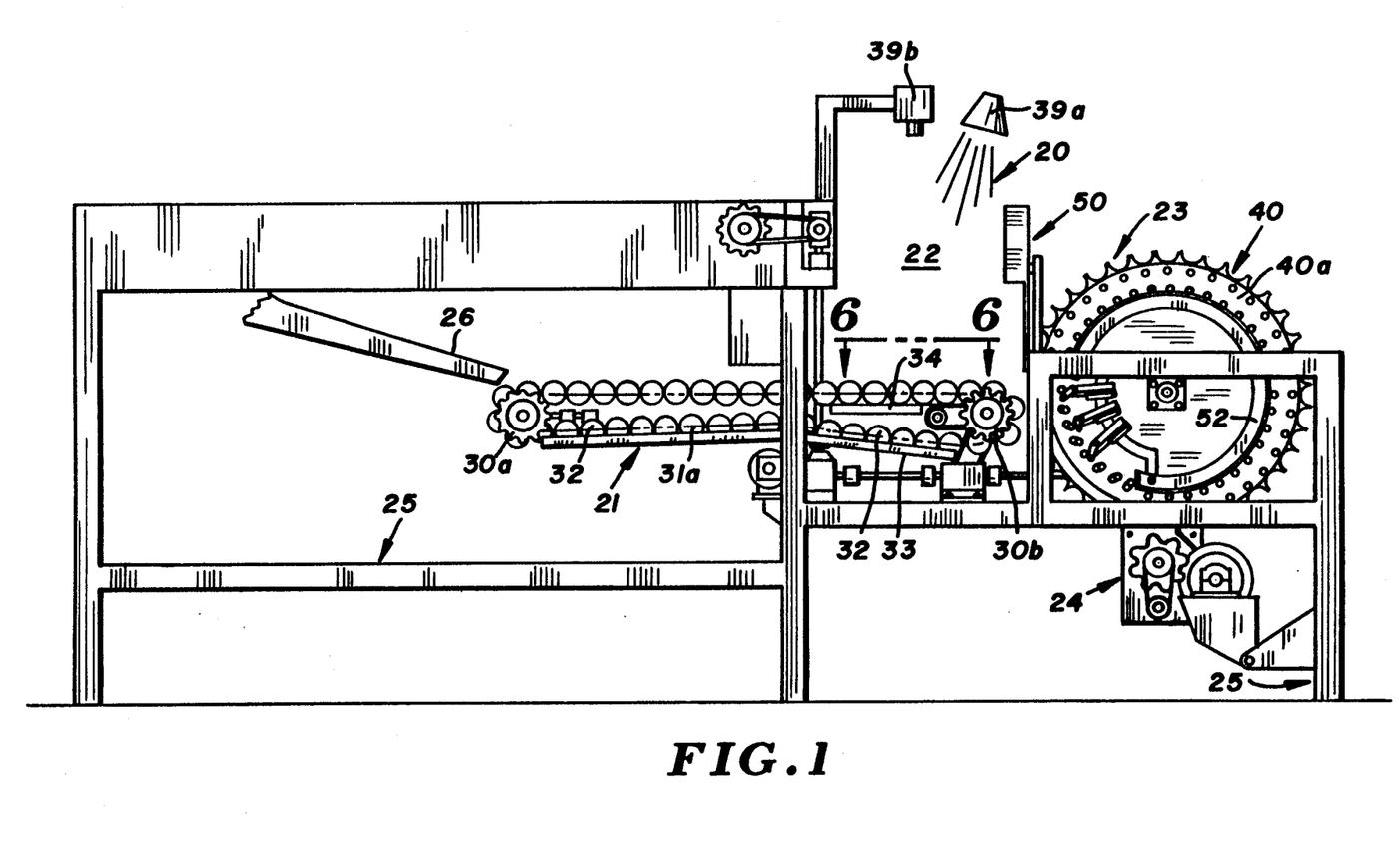
FIG. 1 is a side elevation of the device embodying the concepts of applicant's invention in position to receive previously husked and cleaned ears and which illustrates the entire machine arrangement to accomplish all of the steps of transport, interrogation and sorting of such ears.
Figure 2:
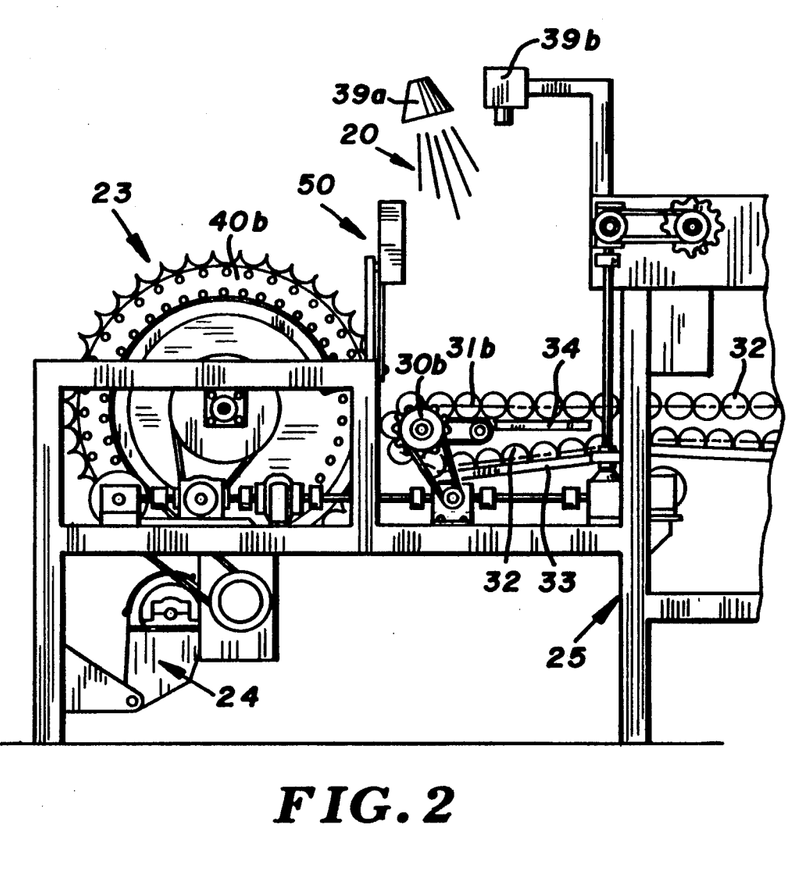
FIG. 2 is a partial elevation taken from the opposite side of the device illustrated in FIG. 1.
Figure 3:
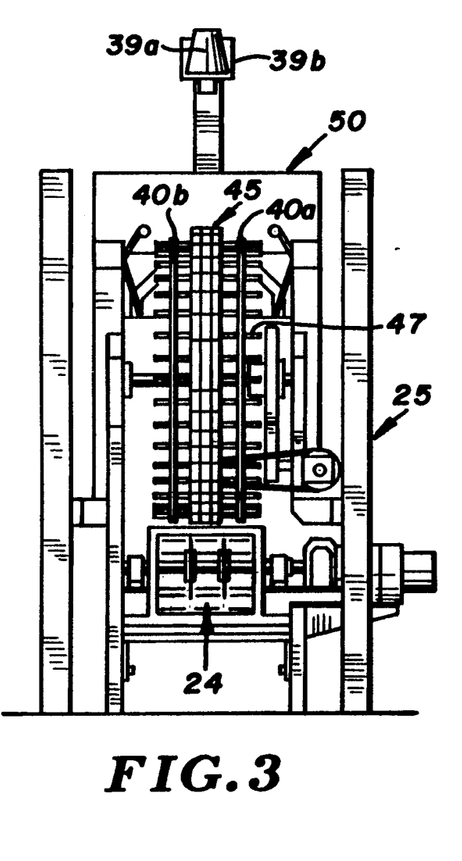
FIG. 3 is an end view of the device illustrated in FIGS. 1 and 2.

The transfer section 23 which appears in the overall layout in FIGS. 1 and 2 is also illustrated in FIGS. 4, 5 10 and 11.

Figure 10:
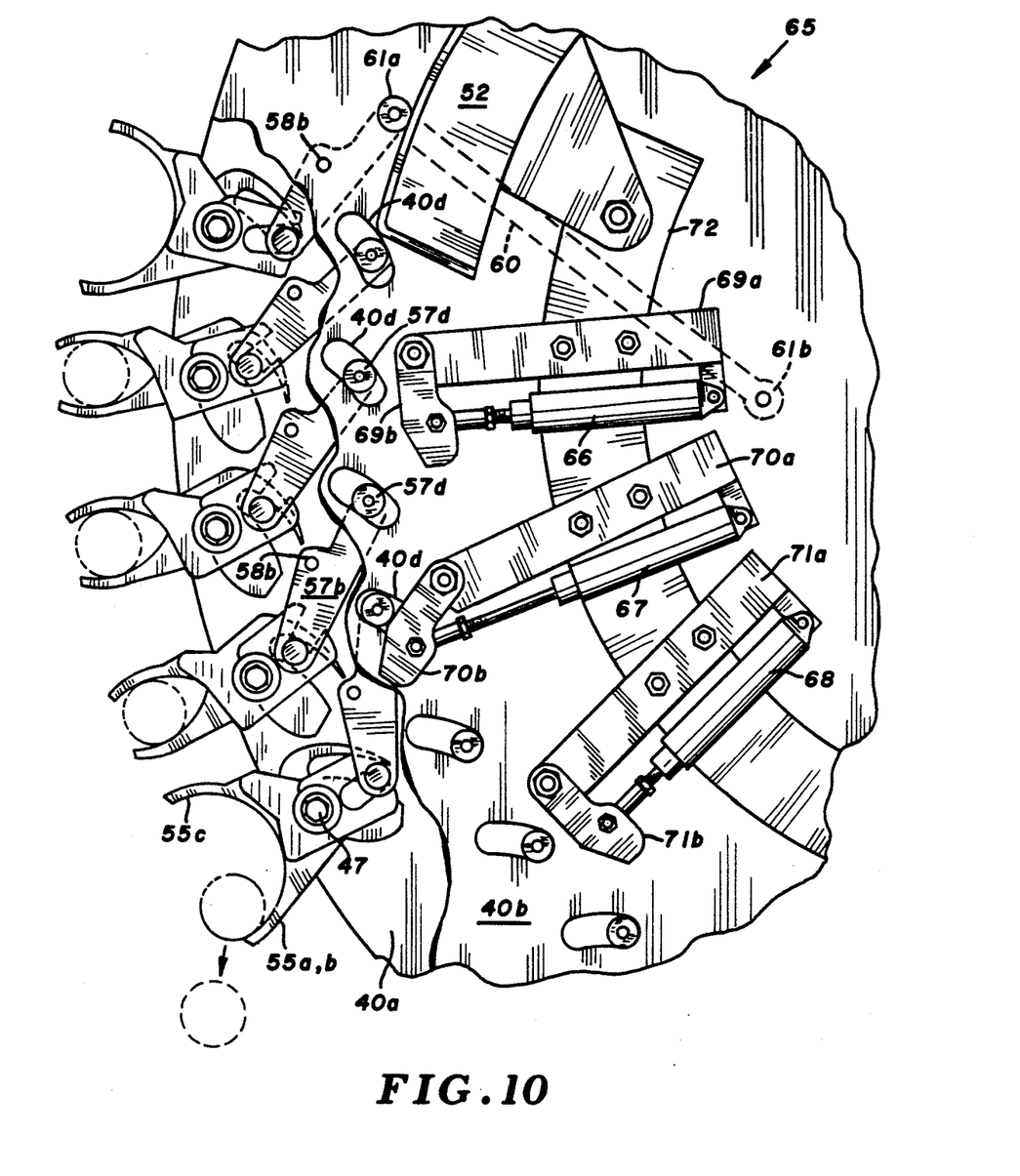
FIG. 10 is a view of the transfer section of the unit which provides a composite operating view to particularly illustrate opening of any clamp unit upon command.
Figure 11:
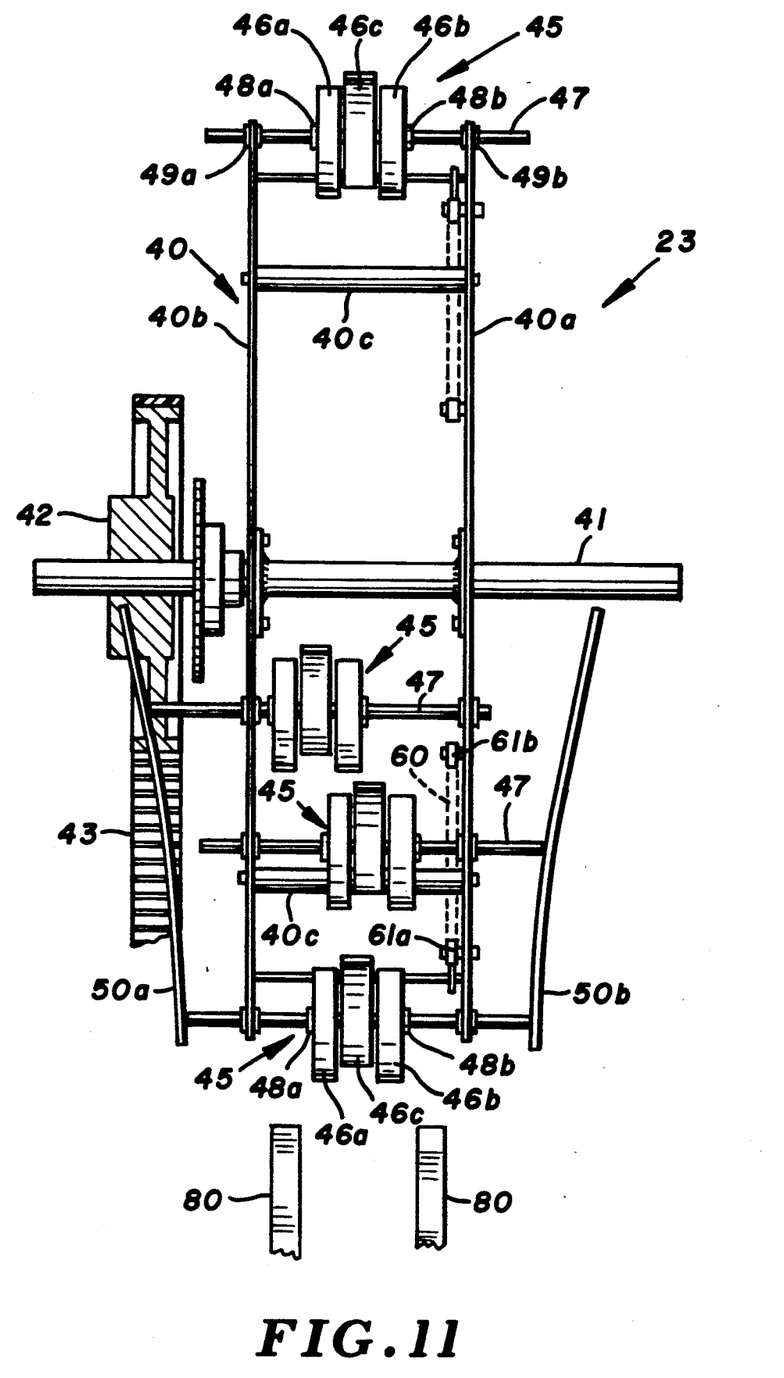
FIG. 11 is a view taken from one end of the wheel transfer section of the unit to illustrate only select portions of the device in operative correlation to one another with particular direction to a camming ramp arrangement to shift ear clamp elements and clamped ears to bring the same into proper centered alignment to enter the trimming portion of the unit.

FIG. 11 illustrates the transfer section 23 in a basic mechanical schematic form and does not include all portions of a complete unit. As its basic structure, transfer section 23 includes a wheel structure 40 defined by a pair of generally circular side plates 40a, 40b spaced through spaced bars 40c and mounted upon shaft 41 which is driven through pulley 42 and drive belt 43. The rotation of the transfer wheel structure unit is correlated to the driving of the initial conveyor 21 to insure that ears E are timely delivered to clamp units 45 carried by the wheel plates 40a, 40b. Clamp units 45 are further described in connection with FIGS. 8, 9 and 10 and at this time it is sufficient to state that each clamp unit 45 consists of a pair of side clamp elements 46a, 46b and a central clamp element 46c each of which is mounted in controlled clamping position on shaft 47 between axial stop elements 48a, 48b. Shaft 47 is slideably mounted within passages and suitable bearing structures 49a, 49b provided in the wheel side plates 40a, 40b. In this manner then the shafts 47 and the carried clamp elements 46a, 46b, 46c are transversely shiftable as a unit within the boundaries of side plates 40a, 40b. As illustrated, a plurality of clamp 45 and shaft 47 assemblies are spaced about the wheel plates 40a, 40b.

Figure 4:
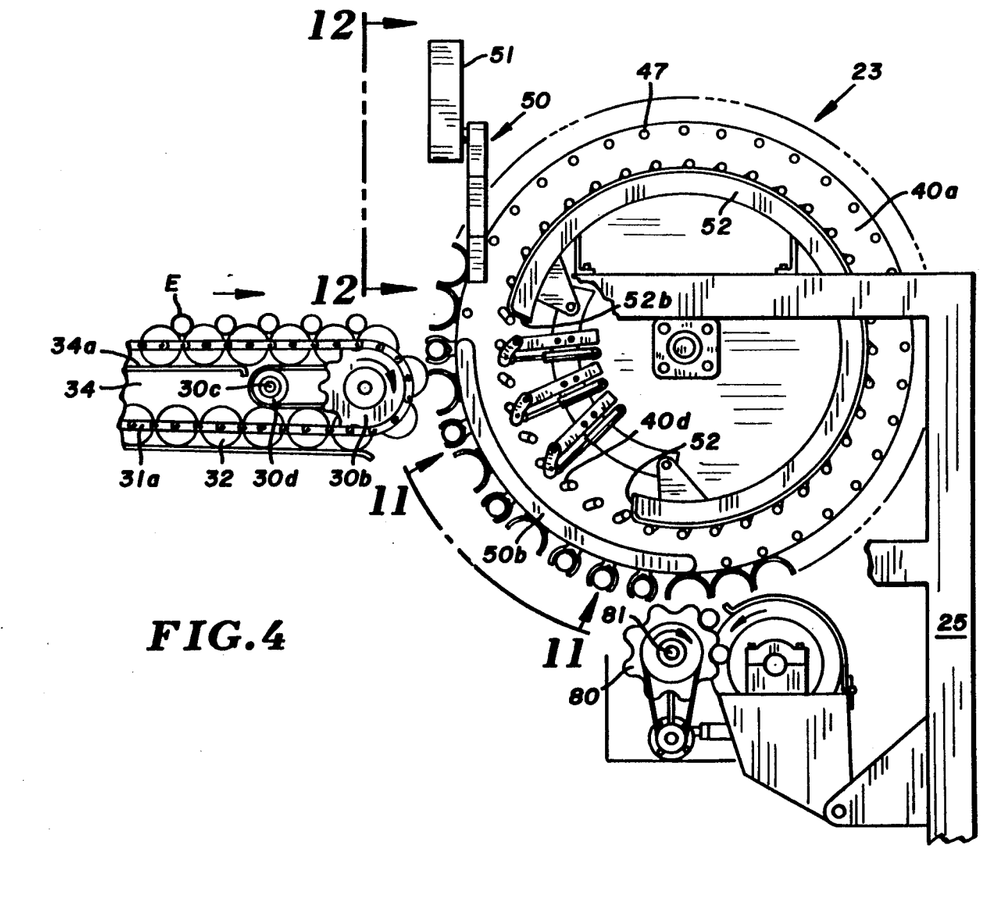
FIG. 4 is an elevation of an ear transfer portion of the device drawn to an enlarged scale from that used in FIGS. 1 and 2.
Figure 5:
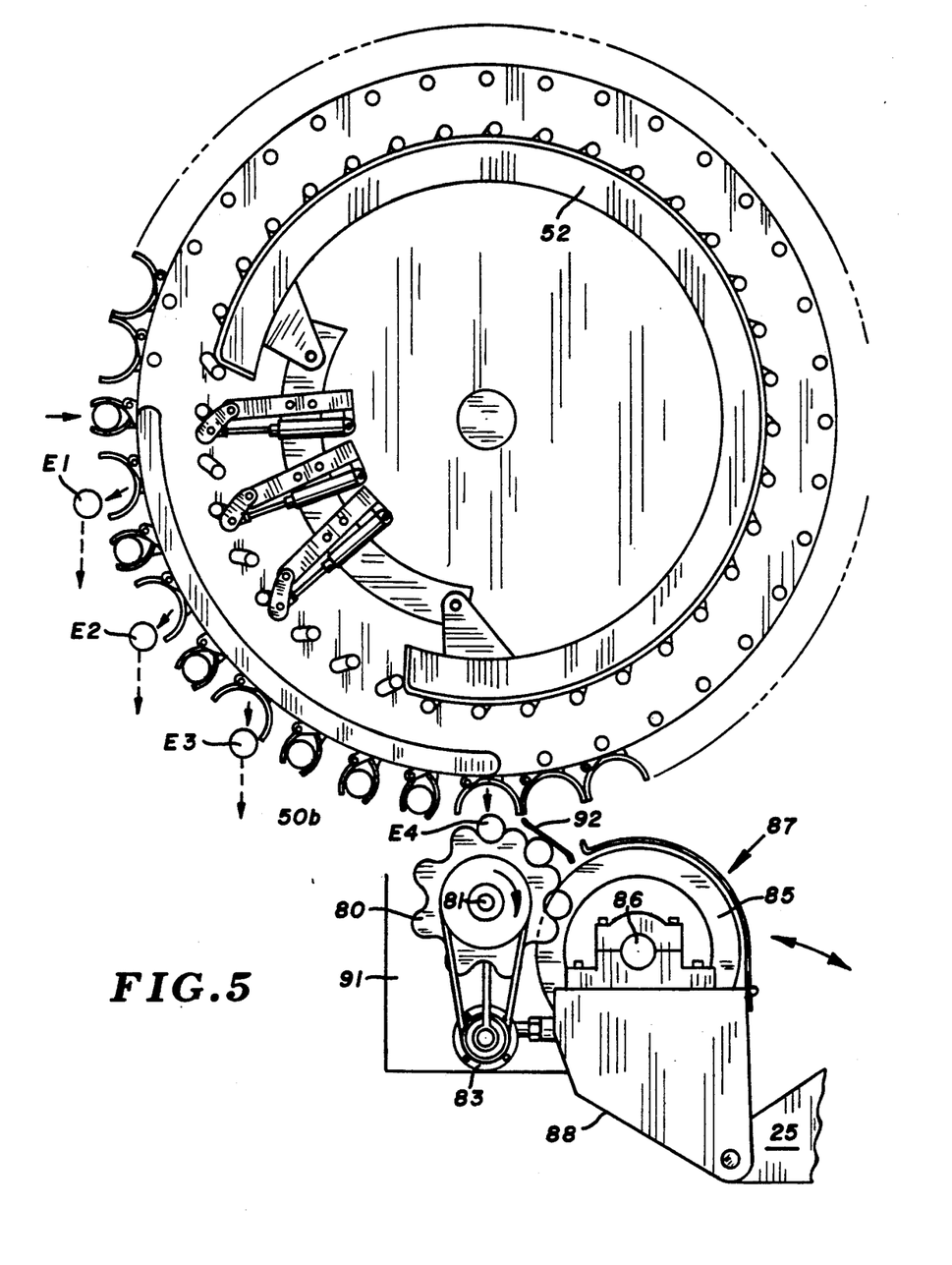
FIG. 5 is an illustration of the main ear transport of the device in a scale larger than that illustrated in FIGS. 1, 2 and 4 and which particularly illustrates the ear sorting aspect of the device as well as the devices for trimming of ears to length.
Figure 6:
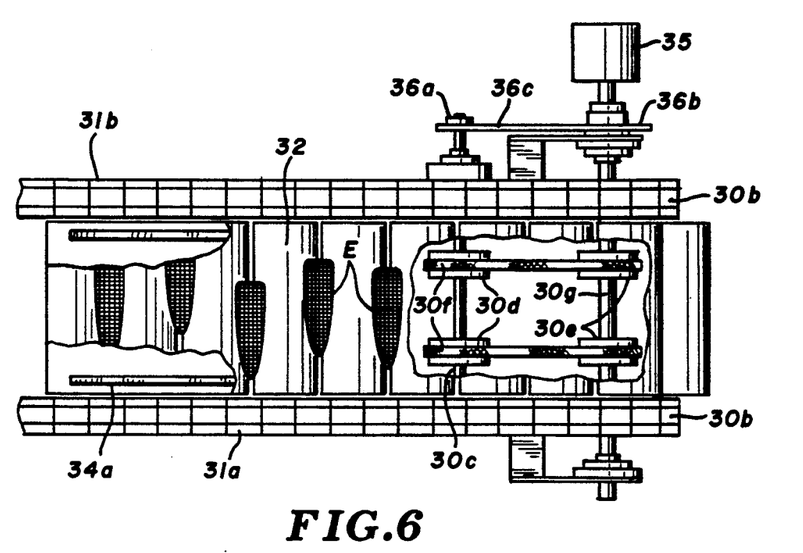
FIG. 6 is a horizontal section taken substantially along line 6—6 of FIG. 1.
Figure 7:
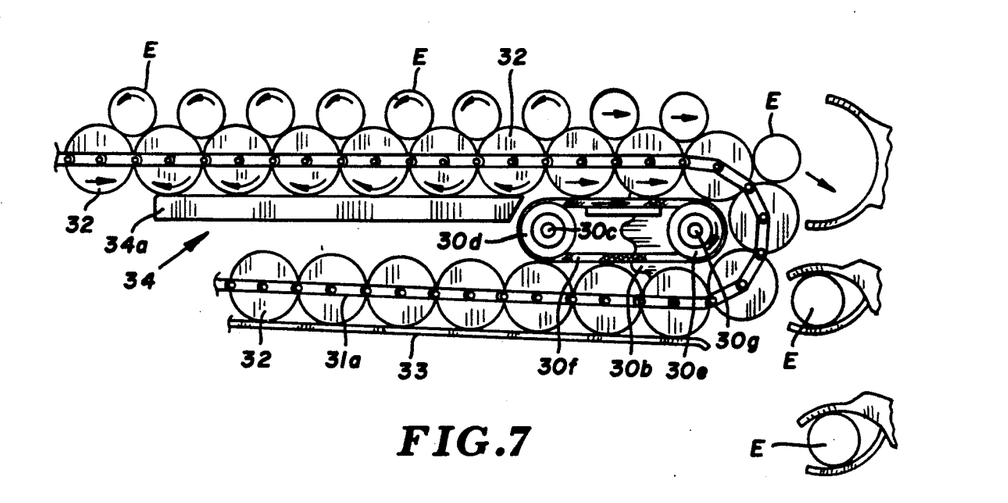
FIG. 7 is a side view of the portion of the ear transport area illustrated in FIG. 6 drawn to an enlarged scale.

FIGS. 4, 5 and 11 illustrate a particularly formed pair of camming ramps 50a, 50b arranged exteriorly of the side plates 40a, 40b which serve to bring the clamping structures 45 into position intermediate plates 40a, 40b such that they are in centered and proper position for movement of an ear E into the trimming section 24. As illustrated, these ramps 50a, 50b encompass approximately one-quarter of wheel 40 travel and the shape thereof provides a complex curve with primary control thereof being to bring the clamps 45 into a centered position and to thereafter maintain such position from ear pickup through all stages of delivery of the ear. The clamping units 45 remain in this centered position for the remainder . of their arcuate travel, until they are repositioned for clamping of another ear E through a clamp locator device generally designated 50 which functions in association with programmed operation. Locator device 50 shifts the clamp units 45 into ear pickup position by transversely moving mounting shaft 47 through abutment with the exterior ends thereof, such shaft ends extending through the respective side plates 40a, 40b of wheel 40. Locator 50 is more thoroughly described hereinafter.

Figure 8:
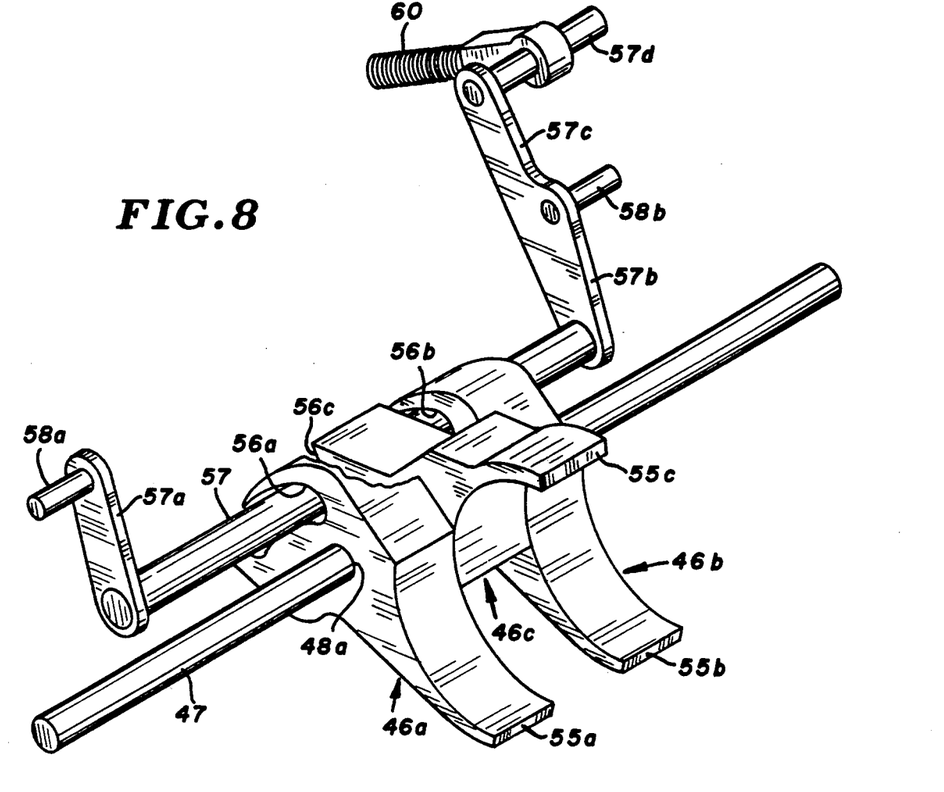
FIG. 8 is a perspective view of a single clamp unit for individual ears illustrating the various mounting and cam shafts provided for proper positioning and actuation thereof.
Figures 9A, 9B:
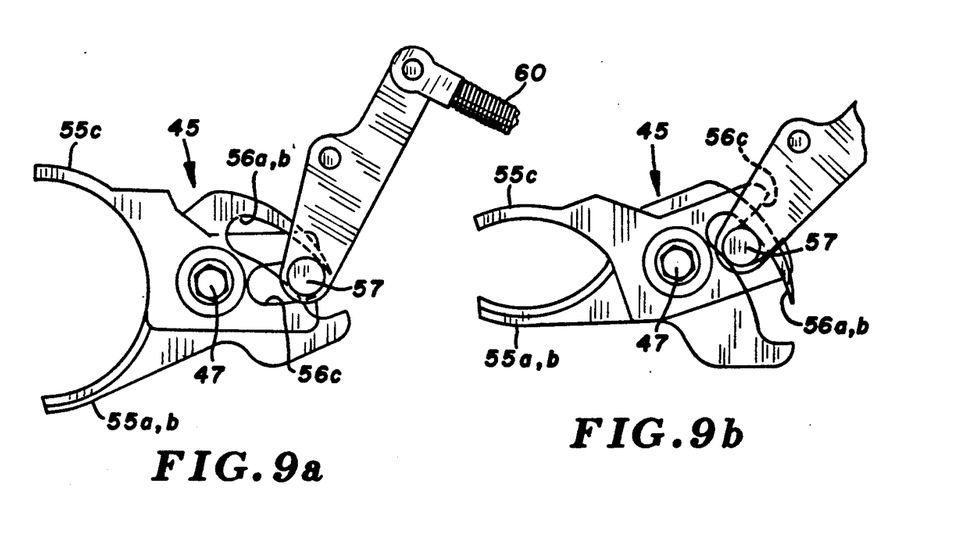
FIG. 9a is a view of an ear clamp in open position.
FIG. 9b is a view of an ear clamp in closed position.

Clamp units 45 are particularly illustrated in the perspective view of FIG. 8 and the two operative views of FIGS. 9a and 9b.

Each of the clamps 45 includes a pair of identical side clamp members 46a, 46b and an oppositely disposed clamp member 46c centrally thereof. Forwardly extending, generally arcuate tines or half jaws are provided respectively on each of these members 46a, 46b, 46c such that two lower half jaws 55a, 55b are provided in opposed relation to an upper half jaw 55c for clamping an ear E therebetween. As illustrated throughout the views, these half jaws 55a, 55b, 55c are mounted for opening and closing rotation on shaft 47 and extend radially outward of the periphery of the wheel plates 40a, 40b to receive ears as they are transferred from the initial conveyor 21. Operating means for the half jaws 46a, 46b, 46c includes an arcuate cam surface 56a, 56b, 56c on the opposite ends of clamp elements 46a, 46b, 46c such that shaft 47 serves as the fulcrum point of movement of such elements. Shaft 57 is positioned within such cam surface areas and is mounted for camming movement through a pair of arm members 57a, 57b pinned to wheel plates 40a, 40b through pins 58a, 58b. Actuation and shaft 57 movement is obtained through arm extension 57c and pin 57d extending from arm 57b. Extension 57c provides an active lever arm to shaft 57 and the position thereof is through pin 57d which extends through apertures 40d in wheel plate 40b. Means for maintaining the clamp elements in open position is provided exteriorly of wheel plate 40b and consists of a generally arcuate cam 52 carried on frame 25.

As illustrated in FIGS. 4 and 5, this cam 52 encompasses approximately three-quarters of wheel travel and will abut with a bearing member provided on the ultimate end of pin 57 or may simply ride against such pin. Thus, during such travel duration, the clamps 45 will be held in open position by cam 52 contact and will be in centered position due to friction of shaft 47 within bearings 49a, 49b and the fact that no external force exists to shift the same from centered position.

Between the entrance end 52a and exit end 52b of cam 52, the clamps 45 are brought into ear clamping position and the shifting thereof is caused by reactive spring 60 which has a first end 61a secured to pin 57d of lever 57c and a second end 61b secured to the interior of wheel plate 40b.

With a single selective function, assuming all ears of corn would meet the preset standards and each ear had an acceptable six inch length, the clamps 45 could simply be shifted to clamp within this length through locator 50, the ears would be clamped as they exited conveyor 21 and they would be carried to the trimming section 24 where re-engagement with cam 52 would open the clamps to release the ears for trimming. As previously stated, certain of the ears will not meet such criteria and therefore applicant has included a release upon command section within the clamped area.

This release upon command section best illustrated in FIGS. 4, 5 and 10 and is designated in its entirety 65. As illustrated therein, three hydraulic or air actuated cylinders 66, 67, 68 with clamp trip elements consisting of stationary legs 69a, 70a, 71a and slave legs 69b, 70b, 71b are mounted on frame wing 72 connected to main frame 25 in a position to properly place the slave legs 69b, 70b, 71b which are mounted on frame wing 72 connected to main frame 25 in a position to place the slave legs 69b, 70b, 71b in controlling relation to pins 57d of cam shaft 57. As an ear of corn is interrogated in section 22, its condition is processed and, for example should the ear not be totally cleaned, the micro processor provides direction to the release-on-command section 65 to actuate an appropriate cylinder for clamp release. For example, the ear may not be totally husked and be identified as requiring recycling and release of the ear E will be carried through by the first cylinder-leg combination identified by cylinder 66 and legs 69a, 69b. Opening of the proper clamp 45 will result through actuation of the cylinder which moves the slave leg against pin 57d to drop the ear in the position designated as E1 of FIG. 5. Other parameter conditions will result in drops of ears E2, E3 as programmed. Ears not so ejected will continue to the trimming section 24. Conveying means, not shown, would be provided to receive ears E1, E2 and E3 for further direction of the same.

Figure 12:
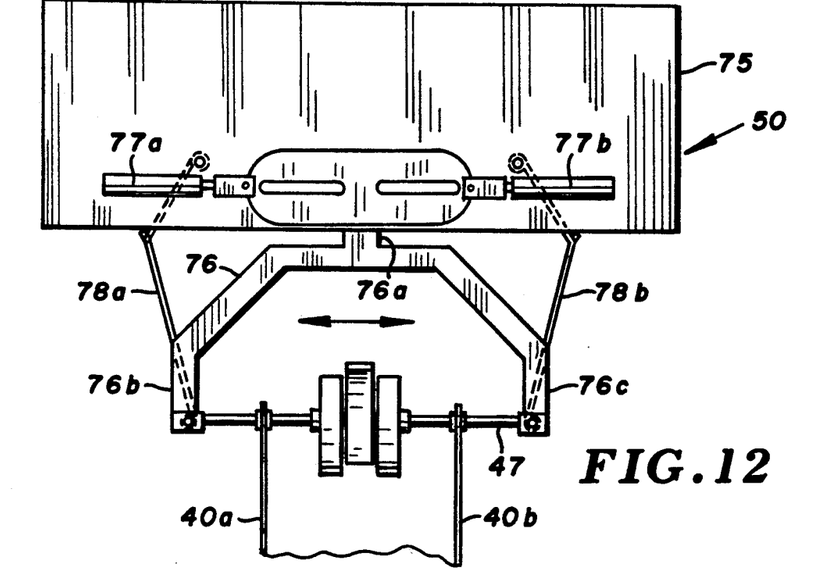
FIG. 12 illustrates the means for shuttling the ear clamps for proper grasping of the ear within its desired length.

The clamp locator has previously been designated 50 and is best illustrated in FIG. 12. In the form shown, an actuator housing 75 is carried by frame 25 and mounted above the conveyor section 21 and the transfer section 22 to shift the clamp carrying shafts 47 in response to an interrogation thereof within section 22. The shifting mechanism includes an inverted U-shaped member 76 having a vertically arranged shaft 76a extending upward for movement by, in the form shown, a pair of actuating, opposed, powered cylinders 77a, 77b and downwardly extending legs 76b, 76c. The ends of such downwardly extending legs 76b, 76c are arranged in position to contact the ends of shaft 47 for movement thereof in accordance with the location of the select length of the ear as previously discussed. Swing support arms 78a, 78b are provided between housing 75 and the respective lower ends 76b, 76c of the U-shaped member 76 as a load relief arrangement. Movement of the member 76 is particularly rapid and elimination of weight through such arms 78a, 78b is imperative to rapid movement. Other devices for movement of such U-shaped member 76 are equally useable without departing from the scope of the invention and could include ball screws as driven by stepping motors.

Figure 13A:
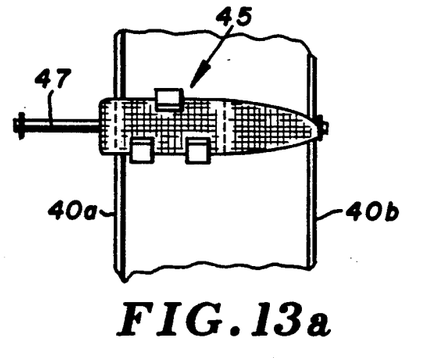
FIG. 13a and 13b illustrate alternative positions for clamping an ear of corn within a desired area of length of corn.
Figure 13B:
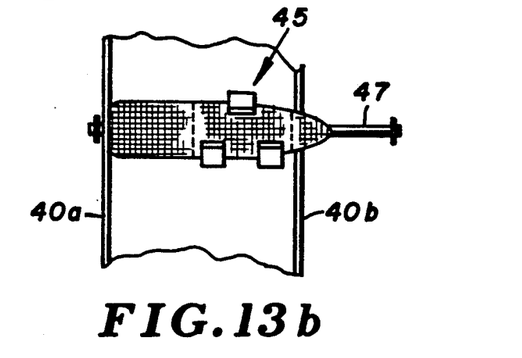
Figure 14:
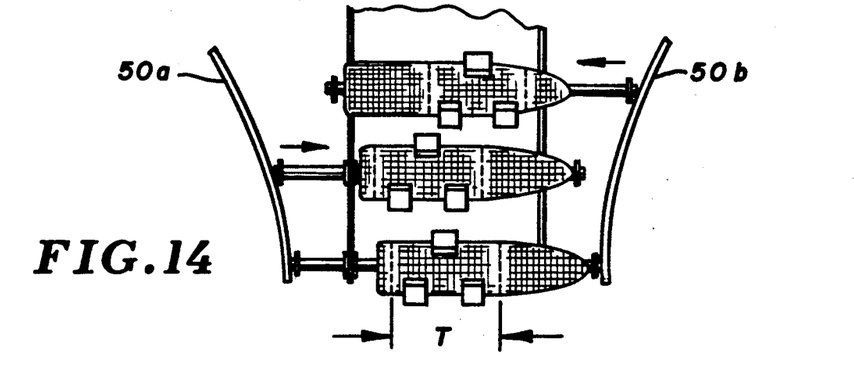
FIG. 14 further illustrates the shuttling arrangement for shifting of the clamped ear into proper centering and trimming range.
Figure 15:
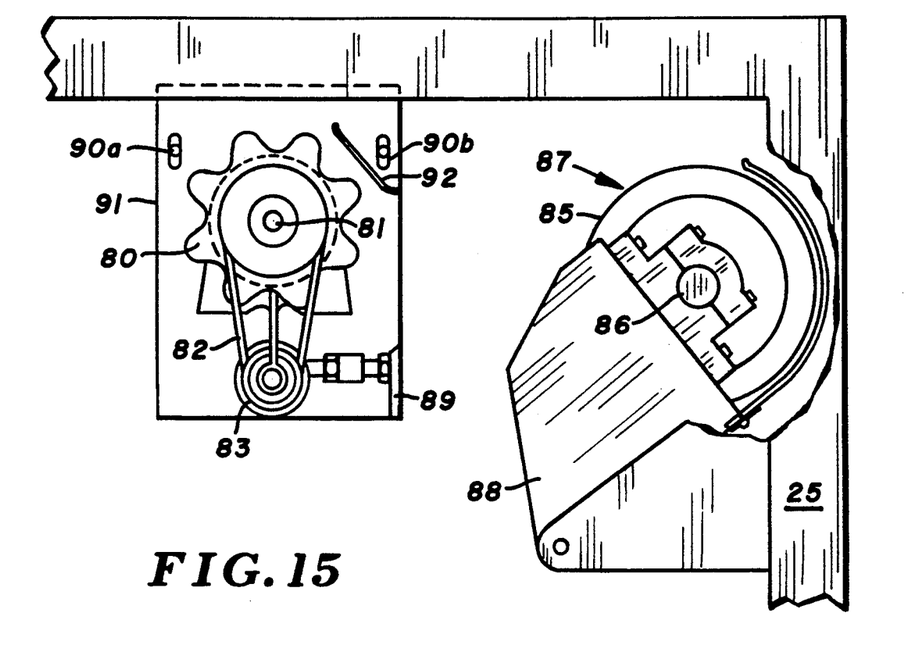
FIG. 15 illustrates the cutting or trimming portion of the unit with the cutter device illustrated in open position; and, FIG. 16 is a view similar to FIG. 15 wherein the trimming knives have been swung into trimming position.

FIGS. 13a, 13b illustrate the range of movement of the shaft mounted clamps 45 and FIG. 14 illustrates the return thereof to center, trim, position as dictated by cams 50a, 50b into the dotted line trim area T.

Trimming section has previously been designated 24 in its entirety and is positioned, as illustrated in the views and particularly in FIG. 5, as underlying the entrance end 52a of cam 52 such that the clamps 45 will open above an ear receiving star wheel 80 mounted on shaft 81 and driven by belt 82 by motor 83. The views, 15, 16 of this section 24 are side elevations and it should be obvious that shaft 81 extends transversely of the machine and a pair of such star wheels 80 are arranged in spaced transverse relation across the machine as illustrated in FIG. 11 where the ear has been brought into the central trimming position to allow cutting into the selected lengths. Obviously if only the ends of the ear are to be cut then a pair of saw devices are utilized. If, for example the ear is to be cut into two three inch lengths, then a corresponding number of trimming saw blades 85 with proper drives 86 and correlative star wheels 80 are provided for proper support of the ear during cutting with the cutting blades being spaced for proper ear cut. The entire trimming unit designated 87 includes means such as a rotatably mounted arm 88 attached to frame 25. Stop 89 controls cut of the trimming unit. Means to vertically adjust the position of star wheel mounting plate 91 is provided through attachment means 90a, 90b.

Figure 16:
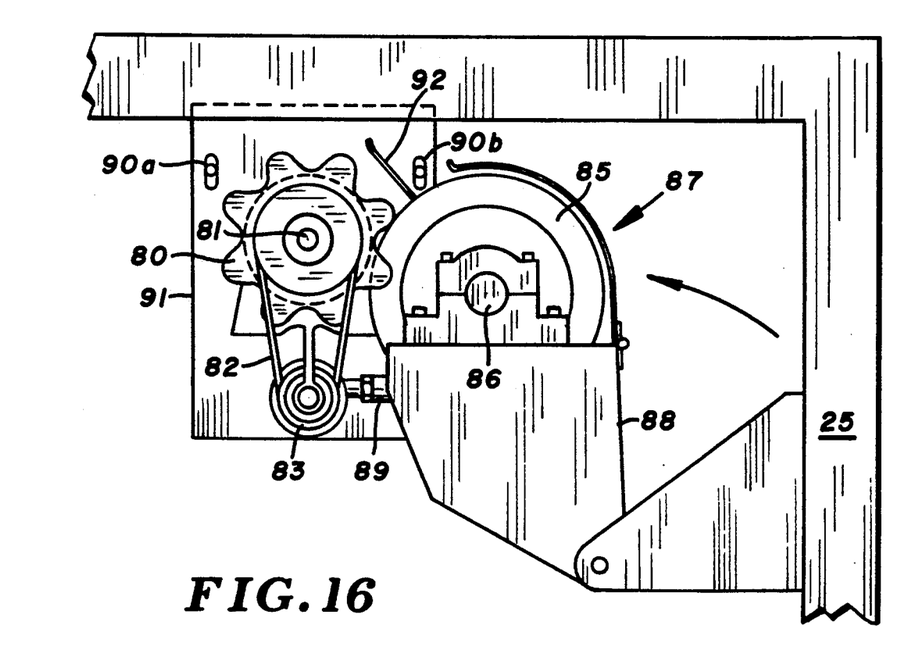

As illustrated, an acceptable ear E4 is dropped into the star wheel sprocket set 80 and the star wheel carries the ear only through a 90 degree rotation into trimming position for the saw 85. In use, the structure of the saw will be maintained in its cutting position as illustrated in FIGS. 5 and 16. Although not found to be necessary, an ear retainer arm 92 may be provided to overlie the ears E4 as they are swung through the 90 degree star wheel arc. After cutting, the ears drop from the star wheel saw arrangement into a conveying or moving device 93 for transport to a remote location for further processing.

After a clamp 45 has been opened to release the ear E4 into the star wheel 80 the clamp is maintained in its central position, intermediate wheel sides 40a, 40b and in its open position by cam 52 until it reaches the area of relocation by locator 50.

It should be obvious that the applicant's device then provides means for delivering ears in at least a husked, generally clean condition for interrogation and direction for further processing. As stated, the complete device provided herein is directed to complete interrogation for selection of a predetermined length thereof within a length of an ear of corn.

The interrogation of the unit and the resultant control of the unit is very comparable to a human inspector examining each ear and correlating its movements to the transfer unit with its ultimate, directed disposal. The processing technique included herein presets transverse clamp location in accordance with the condition of the ear it is to receive and directs its continued flow through the machine. It should be obvious that if an ear does not possess the required parameter meeting length, that the clamping device does not need transverse positioning to bring the ear to a proper cutting condition. It is then only necessary that the position of the ear be "read" to, if necessary, shift the clamp to firmly clamp the ear and prevent its possible falling from the unit.

It should be obvious that the applicant has provided a new and unique ear analyzing mechanism with control of the ears for subsequent processing.

What is claimed is:

1. A device for interrogation, classification and transport ears of corn to various use locations in accordance with parameters of selection, the device including:
   a. initial conveyor means arranged and constructed for receiving cleaned and husked ears of corn and conveying the same;

b. second conveying means positions for receiving ears of corn from said initial conveyor means for transport thereof to a use area;

c. an ear interrogation section arrange in association with said initial conveyor means or inspection of ears conveyed thereby and generating a signal in accordance with the condition of the kernels of the ear;

d. said second conveying means including controllable ear receiving and retaining means;

e. said controllable ear retaining means of said second conveying means including clamp members;

f. said clamp members being transversely shiftable for receiving nd clamping the ears receiving from said initial conveying means at desired longitudinal position.

2. The device as set forth in claim 1 and controllable clamp positioning means responsive to the signal generated by said interrogation section to shift the same into position to clamp an ear of corn in a longitudinal location for proper trimming of the same in accordance with the predetermined selection and classification parameters.

3. The device as set forth in claim 2 and second clamp positioning means arranged in association with said second conveying means to shift said clamp means to a position generally centrally of said second conveying means subsequent to clamping the ear of corn.

4. The device as set forth in claim 3 wherein said second clamp positioning means includes a pair of camming surfaces arranged respectively on opposite sides of said second conveying means to bring said clamp means into said trimming position.

5. The device as set forth in claim 4 wherein said clamp means includes at least a pair of opposed extending clamp elements arranged for clamping an ear of corn therebetween and lever means arranged in operative position of said clamp elements for opening and closing of said clamp elements.

6. The device as set forth in claim 5 and biasing means associated with said lever means normally biasing said clamp members into closed position.

7. The device as set forth in claim 6 and selectable, controllable clamp lever actuating means positioned on said second conveying means for selectively opening said clamp members in response to a signal generated by said interrogation section for commandable release of an ear.

8. The device as set forth in claim 6 and at least a pair of selectable, controllable clamp lever actuating means positioned with respect to said second conveying means for selectively opening said clamp members in response to a signal generated by said interrogation section commandable release of an ear.

9. The device as set forth in claim 9 wherein each of the selectable, controllable clamp lever actuating means is responsive to a particular signal generated by said interrogation section for commandable release of an ear of corn in response to the condition of the ear and the parameters of selection and classification of the husks thereof.

10. The device as set forth in claim 1 and:

a. said controllable ear receiving and retaining means including clamp members for receiving ears of corn from said initial conveyor;

b. biasing means normally urging said clamp members into ear clamping position;

c. first clamp controlling means for opening said clamp members to receive ears from said initial conveyor; and, d. second clamp controlling means for opening said clamp members to release ears of corn therefrom in position relative thereto a desired use area.

11. The device as set forth in claim 10 and said first and second clamp controlling means for opening said clamp members including stationary cam elements positioned with respect to said second conveying means to control said clamp members as they are moved therepast.

12. The device as set forth in claim 11 and said first and second clamp controlling means for opening said clamp members arranged as a continuous camming surface whereby said clamp members are maintained in open position.

13. The device as set forth in claim 11 and:

a. an ear trimming means arranged in position to said second conveying means to receive ears of corn therefrom upon opening of said clamp control means by said second camming means; and, b. said ear trimming means including at least a pair of ear trimming elements arranged in position to cut ears of corn to a predetermined length.

14. The device as set forth in claim 13 and said ear trimming means including means for conveying received ears into position for trimming thereof by said trimming means in spaced relation from said second conveying means.

15. The device as set forth in claim 14 and said ear trimming means including a selected number of ear trimming elements arranged in position to cut ears of corn into at least two predetermined lengths.

16. The device as set forth in claim 13 and said ear trimming means including sprocket means arranged and constructed to receive ears of corn to be trimmed into sprocket areas thereof.

17. The device as set forth in claim 16 and means for driving said sprocket means for shifting the ear into trimming position spaced from said second conveying means.

18. The device as set forth in claim 1 wherein said initial conveyor means includes:

a. a pair of transversely spaced and generally horizontally arranged endless members;

b. a plurality of roller members extending between said driven members; and, c. drive means associated with said endless members for continuous driving thereof and conveying of ears of corn with such ears positioned between adjacent roller members.

19. The device as set forth in claim 18 and stationary roller contact means arranged at a selected portion of said initial conveyor to contact roller members as they are driven therepast to produce rotation thereof whereby ears of corn carried thereby are rotated through said interrogation section.

20. The device as set forth in claim 19 including driven roller contacting elements adjacent said stationary roller contact members contacting said rollers to stop rotation thereof whereby transfer of ears from said initial conveyor means to said second conveying means is maintained with the ears in non-rotating condition.

21. The device as set forth in claim 18 and said second conveying means including:

a. a pair of transversely spaced driven conveying elements;

b. said controllable ear retaining means carried intermediate said conveying elements and spaced thereon correlative to the carried spacing of ears of corn on said initial conveying means; and
c. means for driving said initial conveyor means and said second conveyor means in timed relation whereby one of said controlled ear retaining means is positioned to properly receive an ear of corn transported by said initial conveyor means.

22. The device as set forth in claim 21 and said controllable ear retaining means being transversely shiftable with respect to said pair of conveying elements.

23. The device as set forth in claim 22 and means for positioning said controllable ear retaining means.

24. The device as set forth in claim 23 and said means for positioning said controllable ear retaining means being responsive to the signal generated by said ear interrogation section.

25. The device as set forth in claim 24 and said controllable ear retaining means being shiftable from a first ear clamping position to a second ear releasing position.

26. The device as set forth in claim 25 and means for selectively shifting said ear control means between said open and closed position associated with said second conveying means for receiving of ears from said initial conveyor means and retaining the same in clamped position through desired conveying travel and shiftable for discharge of the ears at desired locations throughout the travel by said second conveying means.

* * * * *